United States Patent
Kim et al.

(10) Patent No.: US 9,191,294 B2
(45) Date of Patent: Nov. 17, 2015

(54) MASTER DEVICE FOR CALCULATING SYNCHRONIZED ACTUATION TIME OF MULTIPLE SLAVE DEVICES AND METHOD FOR CONTROLLING THE SAME

(71) Applicant: Foundation of Soongsil University-Industry Cooperation, Seoul (KR)

(72) Inventors: Kang-Hee Kim, Gyeonggi-do (KR); Hyeong-Seok Kang, Seoul (KR); Jin-Young Choi, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 458 days.

(21) Appl. No.: 13/716,725

(22) Filed: Dec. 17, 2012

(65) Prior Publication Data

US 2014/0136642 A1    May 15, 2014

(30) Foreign Application Priority Data

Nov. 14, 2012  (KR) .......................... 10-2012-0128872
Dec. 4, 2012    (KR) .......................... 10-2012-0139454

(51) Int. Cl.
*G06F 15/16*    (2006.01)
*H04L 12/26*    (2006.01)
*H04L 12/40*    (2006.01)
*H04L 12/413*   (2006.01)

(52) U.S. Cl.
CPC ............ *H04L 43/0852* (2013.01); *H04L 12/40* (2013.01); *H04L 12/413* (2013.01)

(58) Field of Classification Search
USPC ......................................... 709/208, 211, 248
See application file for complete search history.

(56) References Cited

U.S. PATENT DOCUMENTS 5,600,632 A * 2/1997 Schulman ...................... 370/252
2012/0089815 A1* 4/2012 Cardinell et al. ............... 712/31

* cited by examiner

*Primary Examiner* — Viet Vu

(74) *Attorney, Agent, or Firm* — Mintz Levin Cohn Ferris Glovsky and Popeo, P.C.; Kongsik Kim; Derek E. Constantine

(57) ABSTRACT

A master device for calculating a synchronized actuation time for an N number of slave devices (N being an integer greater than or equal to 2) includes: a transmitting part configured to transmit a request message a K number of times (K being an integer greater than or equal to 2) to each of the N number of slave devices, where the request message includes an actuation command; a receiving part configured to receive a reply message from each of the N number of slave devices, where the reply message includes information on a K number of end-to-end delay times; and an absolute-time calculating part configured to calculate an absolute time for concurrently actuating the N number of slave devices by using the information on the K number of end-to-end delay times received from each of the N number of slave devices.

6 Claims, 5 Drawing Sheets

MASTER DEVICE FOR CALCULATING SYNCHRONIZED ACTUATION TIME OF MULTIPLE SLAVE DEVICES AND METHOD FOR CONTROLLING THE SAME

CROSS-REFERENCE TO RELATED APPLICATIONS

This application claims the benefit of Korean Patent Application No. 10-2012-0128872 filed on Nov. 14, 2012, and Korean Patent Application No. 10-2012-0139454 filed on Dec. 4, 2012, the disclosures of which applications are incorporated herein by reference in their entirety.

BACKGROUND

1. Technical Field

The present invention relates to a master device and a method of controlling the master device in a system composed of a master and multiple slave devices, such as a distributed embedded system, etc., that can set the quickest time (absolute time of synchronized actuation) for concurrently actuating the multiple number of slave devices without involvement by an administrator.

2. Description of the Related Art

An embedded system refers to a computer system in which the software for operating the system is embedded in the hardware to perform only specific functions. Unlike a personal computer, the embedded system has a unique set of requirements and only performs predefined tasks.

One type of embedded system, the distributed embedded system, may include multiple slave devices that operate for the same purpose and a master device for controlling the operation of the slave devices. Here, the master device and the slave devices each correspond to a "computer system in which the software for operating the system is embedded in the hardware to perform only specific functions" mentioned above.

In a distributed embedded system such as a motion control system, etc., the multiple slave devices may have to be actuated concurrently for a common purpose. In other words, the multiple slave devices have to be synchronized for operation.

However, conventional techniques for synchronizing multiple slave devices require that an administrator personally calculate the synchronization time point and input it to each slave device.

SUMMARY

An aspect of the invention is to provide a master device and a method of controlling the master device in a system composed of a master and multiple slave devices, such as a distributed embedded system, etc., that can set the quickest time (absolute time) for concurrently actuating the multiple number of slave devices without involvement by an administrator—in other words, allow the system to autonomously set (self-tune) the synchronization time for the multiple slave devices.

One embodiment of the invention provides a master device for calculating a synchronized actuation time for an N number of slave devices (N being an integer greater than or equal to 2). The master device includes: a transmitting part configured to transmit a request message a K number of times (K being an integer greater than or equal to 2) to each of the N number of slave devices, where the request message includes an actuation command; a receiving part configured to receive a reply message from each of the N number of slave devices, where the reply message includes information on a K number of end-to-end delay times, and an i-th end-to-end delay time from among the K end-to-end delay times corresponds to a difference between a time point when an i-th request message from among the request messages transmitted a K number of times was transmitted and a time point when the slave device was actuated by the i-th request message; and an absolute-time calculating part configured to calculate an absolute time for concurrently actuating the N number of slave devices by using the information on the K number of end-to-end delay times received from each of the N number of slave devices.

The information on the K number of end-to-end delay times can include a curve-form histogram representing times as values along a lateral axis and numbers of end-to-end delay times corresponding to the times as values along a longitudinal axis.

The absolute-time calculating part can calculate an absolute-time miss probability for a candidate absolute time using the equation shown below for each of the N number of slave devices (an N number of absolute-time miss probabilities), and can calculate the absolute time as the candidate absolute time which results in all of the N number of absolute-time miss probabilities being lower than a preset threshold probability:

$$AMP_n = \frac{\int_D^\infty H_n(t)dt}{\int_0^\infty H_n(t)dt},$$

where $AMP_n$ is an absolute-time miss probability for an n-th slave device from among the N number of slave devices, $H_n(t)$ is the curve-form histogram for the n-th slave device, and D is the candidate absolute time.

When the reply message is received via the receiving part, the absolute-time calculating part can calculate the N number of absolute-time miss probabilities by using the candidate absolute time; and if the calculated N number of absolute-time miss probabilities include an absolute-time miss probability that is higher than the threshold probability, the transmitting part can re-transmit the request messages a K number of times, the receiving part can re-receive the reply messages, and the absolute-time calculating part can re-calculate the N number of absolute-time miss probabilities. The operation of the transmitting part for transmitting the request messages, the operation of the receiving part for receiving the reply messages, and the operation of the absolute-time calculating part for calculating the absolute-time miss probabilities can be performed repeatedly with the candidate absolute time incremented by a preset value until the N number of absolute-time miss probabilities do not include an absolute-time miss probability that is higher than the threshold probability.

An initial value of the candidate absolute time and the preset increment value can correspond to a transmission period of the request messages transmitted a K number of times.

The request message can further include information on a time point when the request message was transmitted.

Another embodiment of the invention provides a method of controlling a master device configured to calculate a synchronized actuation time for an N number of slave devices (N being an integer greater than or equal to 2). The method includes: transmitting a request message a K number of times (K being an integer greater than or equal to 2) to each of the N number of slave devices, where the request message includes an actuation command; receiving a reply message from each of the N number of slave devices, where the reply message includes information on a K number of end-to-end delay times, and an i-th end-to-end delay time from among the K end-to-end delay times corresponds to a difference between a time point when an i-th request message from among the request messages transmitted a K number of times was transmitted and a time point when the slave device was actuated by the i-th request message; and calculating an absolute time for concurrently actuating the N number of slave devices by using the information on the K number of end-to-end delay times received from each of the N number of slave devices.

Certain embodiments of the invention make it possible, in the context of a system composed of a master device and multiple slave devices, such as a distributed embedded system, etc., to set the quickest time (absolute time of synchronized actuation) for concurrently actuating the multiple number of slave devices without involvement by an administrator.

Additional aspects and advantages of the present invention will be set forth in part in the description which follows, and in part will be obvious from the description, or may be learned by practice of the invention.

DETAILED DESCRIPTION

Figure 1:
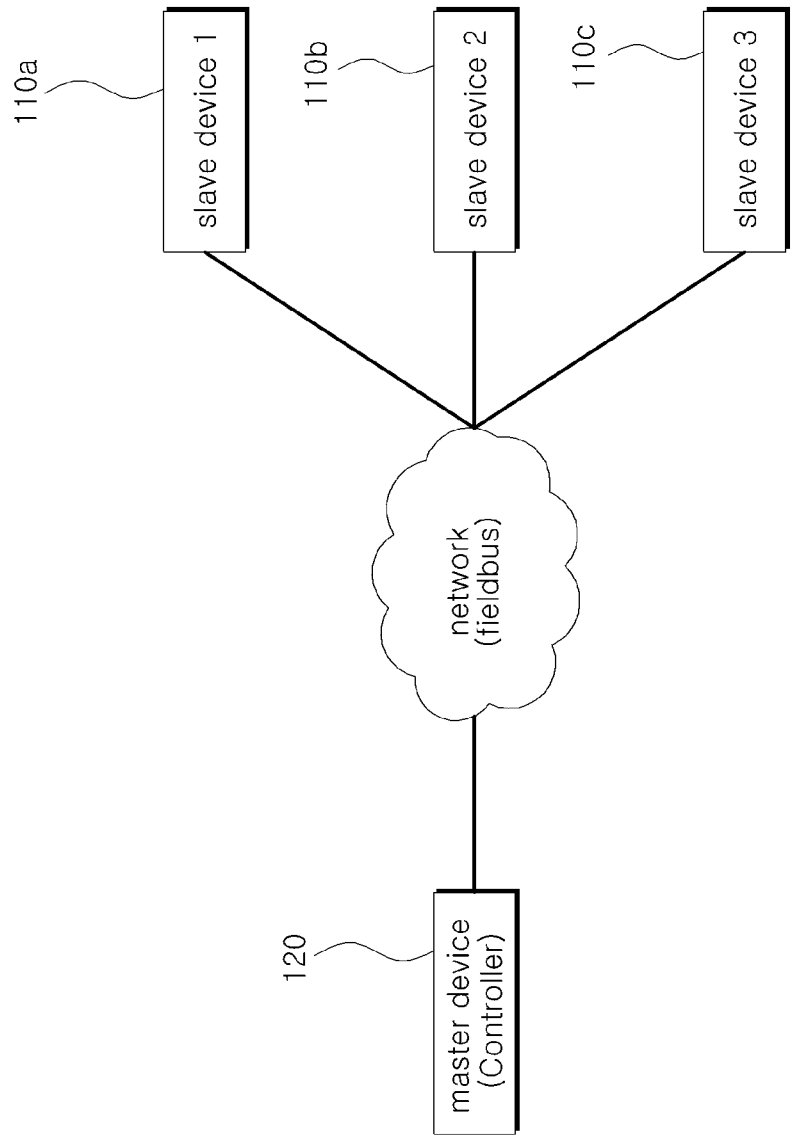
FIG. 1 is a diagram schematically illustrating the composition of a distributed embedded system according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the written description, certain detailed explanations of related art are omitted when it is deemed that they may unnecessarily obscure the essence of the present invention. In describing the drawings, similar reference numerals are used for similar elements.

Certain embodiments of the present invention will be described below in more detail with reference to the accompanying drawings.

FIG. 1 is a diagram schematically illustrating the composition of a distributed embedded system according to an embodiment of the invention.

Referring to FIG. 1, a distributed embedded system 100 according to an embodiment of the invention may include multiple slave devices 110 and a master device 120.

Each of the multiple slave devices 110 can be a computer having the software for operating the system embedded in the hardware to perform only specific functions, as described above. Here, the specific functions can be the same for all of the slave devices 110. For convenience, it will be assumed that there are an "N" number of slave devices 110 (where N is an integer greater than or equal to 2).

The master device 120 may be a device for controlling the overall distributed embedded system and may communicate with the N slave devices 110 over a network (e.g. a fieldbus network). Thus, the operations of the N slave devices 110 may be controlled by the master device 120.

In an embodiment of the invention, the master device 120 may control the N slave devices 110 to actuate concurrently. To this end, the master device 120 may calculate the absolute time at which the N slave devices 110 are to be concurrently actuated and transmit the relevant information to the N slave devices 110, and the N slave devices 110 may be actuated concurrently based on the received information regarding the absolute time.

Figure 2:
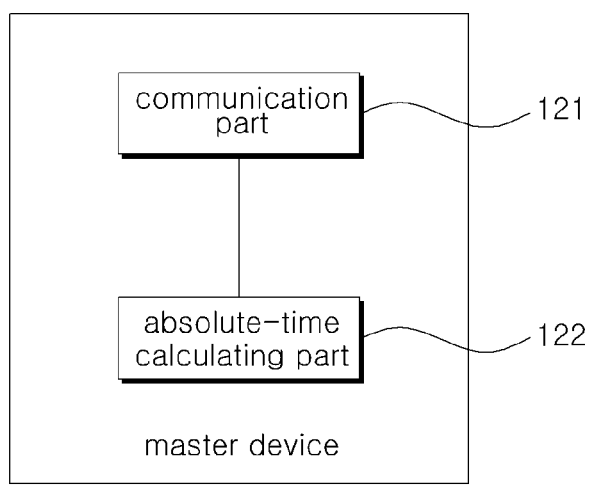
FIG. 2 is a diagram schematically illustrating the composition of a master device according to an embodiment of the invention.

FIG. 2 is a diagram schematically illustrating the composition of the master device 120 described above.

Referring to FIG. 2, the master device 120 may include a communication part 121 and an absolute-time calculating part 122.

The communication part 121 may serve to transmit and receive signals via either wired or wireless connections to and from the N slave devices 110, and may be composed of a transmitting part and a receiving part. The absolute-time calculating part 122 may perform various operations for calculating the absolute time at which the N slave devices 110 are to be concurrently actuated.

Figure 3:
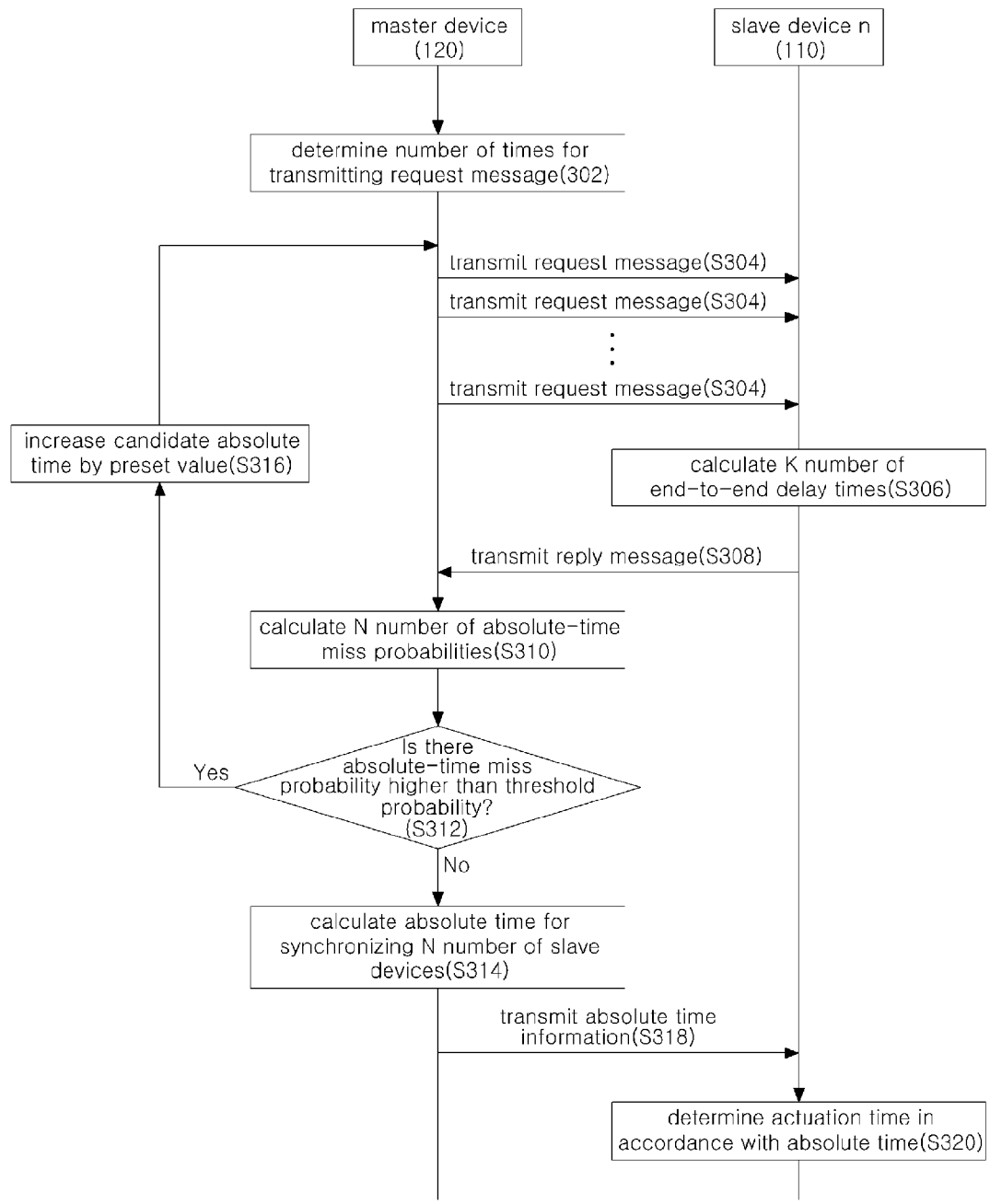
FIG. 3 is a flowchart illustrating the overall flow of a method for calculating the time point for synchronized actuation (absolute time) of an N number of slave devices according to an embodiment of the invention.
Figure 4:
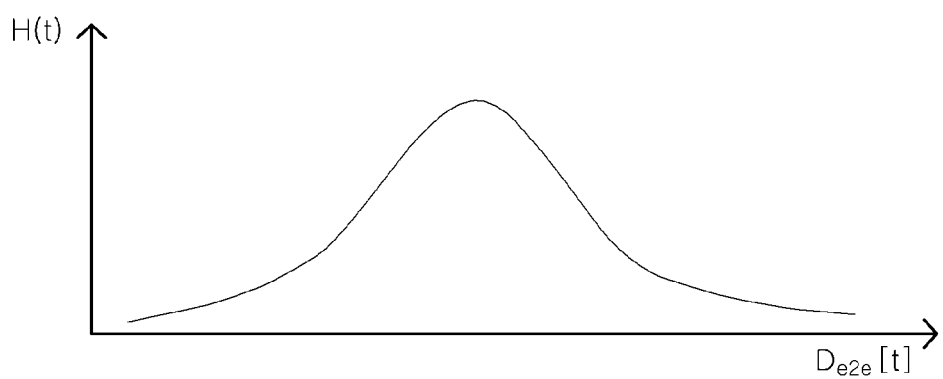
FIG. 4 and FIG. 5 are graphs used for explaining the concept of the K number of end-to-end delay times used in an embodiment of the invention.

FIG. 3 is a flowchart illustrating the overall flow of a method for calculating the time point for synchronized actuation (absolute time) of an N number of slave devices 110 according to an embodiment of the invention.

Although FIG. 3 illustrates an example in which the master device 120 interacts with just one slave device 110 (the n-th slave device), the operations may be performed for all N number of slave devices 110.

A more detailed description of each element and each operation is provided below with reference to FIG. 2 and FIG. 3.

First, in operation S302, the master device 120 may determine the number of times (hereinafter assumed as "K", which is an integer greater than or equal to 2) a request message including an actuation command is to be transmitted to each of the N number of slave devices.

In operation S304, the master device 120 may transmit the request message to the N number of slave devices 110 a K number of times. Here, the request message can further include information on the time point when the request message was transmitted ($T_{TX}$) and information on the number of times the request messages are transmitted (i.e. K), in addition to the actuation command.

The N slave devices 110 that receive the K request messages sequentially may each be actuated when a particular amount of time (required to prepare for actuation) passes after the time point of receiving the request messages.

To be more specific, each slave device 110 may be actuated when a particular amount of time passes after receiving the i-th request message from among the K number of request messages. Afterwards, each slave device 110 may receive the (i+1)-th request message and may be actuated again when a particular amount of time passes after the time point of receiving the (i+1)-th request message. This sequence of receiving a request message and being actuated would be repeated K times.

Continuing with the description, in operation S306, each of the N number of slave devices 110 may calculate an end-to-end delay time ($D_{e2e}$) as the difference between the time when the request message was transmitted from the master device 120 and the time when the slave device was actuated ($T_A$).

Since the N number of slave devices 110 receive the request messages K times as described above, each of the N slave devices 110 may calculate a K number of end-to-end delay times. Among the K number of end-to-end delay times calculated by the n-th slave device 110, the i-th end-to-end delay time may correspond to the difference between the time when the i-th request message was transmitted from the master device 120 and the time when the n-th slave device 110 was actuated by the i-th request message.

Afterwards, in operation S308, each of the N number of slave devices 110 may transmit a reply message to the master device 120, with the reply message including information on the K number of end-to-end delay times.

According to an embodiment of the invention, the information on the K number of end-to-end delay times can be a curve-form histogram having time represented as values on a lateral axis and the number of end-to-end delay times corresponding to the times as values on a longitudinal axis.

In operation S310, the master device 120, having received the information on the end-to-end delay times from the N number of slave devices 110, may calculate an absolute-time miss probability (AMP) expressed by Equation 1 below, for example, using a candidate absolute time for each of the N slave devices (i.e. an N number of absolute-time miss probabilities).

$$AMP_n = \frac{\int_D^\infty H_n(t)dt}{\int_0^\infty H_n(t)dt} \quad \text{[Equation 1]}$$

Here, $AMP_n$ is the absolute-time miss probability for an n-th slave device from among the N number of slave devices 110, $H_n(t)$ is the curve-form histogram for the n-th slave device 110, and D is the candidate absolute time.

Figure 5:
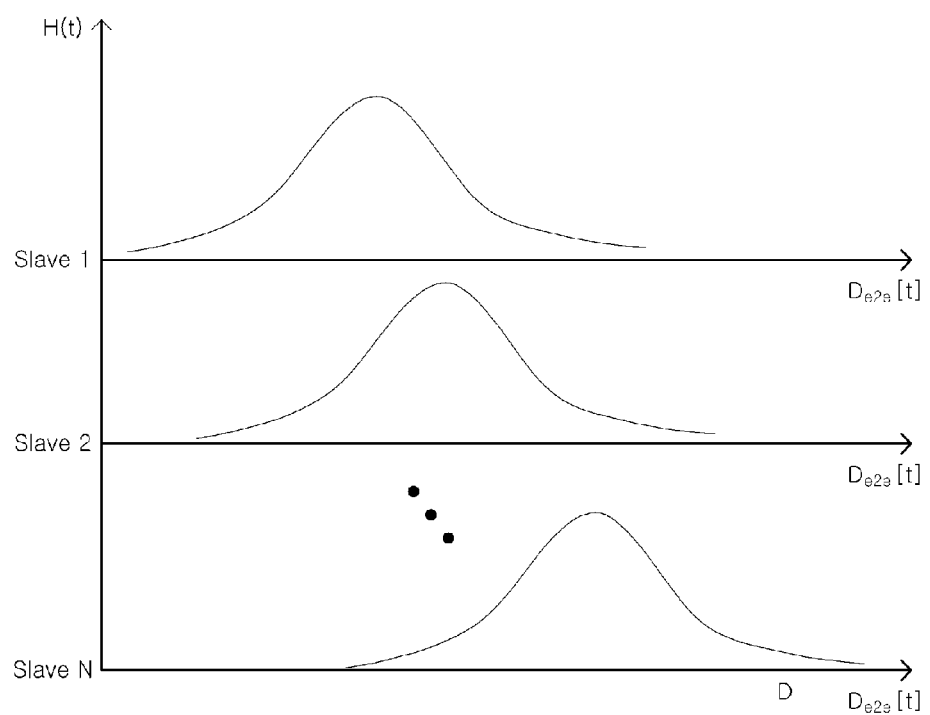

That is, as illustrated in FIG. 5, the master device 120 may set the origin of coordinates for the curve-form histogram with respect to the time at which the master device transmitted a request message, set the candidate absolute time, and then calculate the absolute-time miss probability for each of the N number of slave devices 110. In the example shown in FIG. 5, the absolute-time miss probabilities for slave device 1 and slave device 2 are set to "0", while the absolute-time miss probability for slave device N is set to a particular value.

Afterwards, in operation S312, the master device 120 may determine whether or not there is an absolute-time miss probability higher than a preset threshold probability present among the N number of absolute-time miss probabilities.

If there is no absolute-time miss probability higher than the threshold probability, then the master device 120 may calculate the candidate absolute time as the absolute time for synchronizing the N number of slave devices 110 in operation S314.

Conversely, if there is an absolute-time miss probability higher than the threshold probability, then the master device 120 may increment the candidate absolute time by a present value in operation S316, after which operations S304 to S312 may be repeated.

According to an embodiment of the invention, the initial value of the candidate absolute time and the increment value of the candidate absolute time (i.e. the preset value) can correspond with the transmission period of the request messages transmitted a K number of times. In other words, the master device 120 may, in calculating the first absolute time, perform the operation for calculating the absolute time with the transmission period described above set as the initial value for the candidate time, and may continue the operation for calculating the absolute time with the candidate absolute time incremented by a multiple of the transmission period, until there are no absolute-time miss probabilities that are higher than the threshold probability.

When the calculation of the absolute time is completed, the master device 120 may transmit information on the calculated absolute time to the N number of slave devices 110 in operation S318, and the N number of slave devices 110 may each determine its actuation time in accordance with the calculated absolute time in operation S320 and may operate accordingly.

That is, the master device 120 may calculate the absolute time with which the N number of slave devices 110 may be concurrently actuated, by using the information on the K number of end-to-end delay times received from each of the N slave devices 110. Here, the master device 120 may calculate the absolute time as the candidate absolute time that results in the absolute-time miss probabilities for all N number of slave devices 110 being lower than a preset threshold probability. Thus, when the reply messages are received via the communication part 121, the master device 120 may calculate an N number of absolute-time miss probabilities using the candidate absolute time at the absolute-time calculating part 122.

If there is an absolute-time miss probability from among the calculated N number of absolute-time miss probabilities that is higher than the threshold probability, then the master device 120 may re-transmit the request message a K number of times via the communication part 121, re-receive the reply messages, and re-calculate an N number of absolute-time miss probabilities via the absolute-time calculating part 122. The operations of transmitting the request messages and receiving the reply messages via the communication part 121, and the operation of calculating the absolute-time miss probabilities via the absolute-time calculating part may be performed repeatedly, with the candidate absolute time incremented by a preset value until the N number of absolute-time miss probabilities do not include an absolute-time miss probability that is higher than the threshold probability.

As described above, embodiments of the invention can automatically set the quickest time (absolute time) for concurrently actuating a multiple number of slave devices, in a system composed of a master and multiple slave devices, such as a distributed embedded system, etc. Since it is not necessary for an administrator to set the synchronization time individually for each slave device 110, the costs associated with tuning the task period can be dramatically reduced.

Also, certain embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A master device for calculating a synchronized actuation time for an N number of slave devices (N being an integer greater than or equal to 2), the master device comprising:
   a transmitting part configured to transmit a request message a K number of times (K being an integer greater than or equal to 2) to each of the N number of slave devices, wherein the request message includes an actuation command and information on a time point when the request message was transmitted;
   a receiving part configured to receive a reply message from each of the N number of slave devices, wherein the reply message includes information on a K number of end-to-end delay times, and an i-th end-to-end delay time from among the K end-to-end delay times corresponds to a difference between a time point when an i-th request message from among the request messages transmitted a K number of times was transmitted and a time point when the slave device was actuated by the i-th request message; and
   an absolute-time calculating part configured to calculate an absolute time for concurrently actuating the N number of slave devices by using the information on the K number of end-to-end delay times received from each of the N number of slave devices.

2. The master device of claim 1, wherein the information on the K number of end-to-end delay times includes a curve-form histogram representing times as values along a lateral axis and numbers of end-to-end delay times corresponding to the times as values along a longitudinal axis.

3. The master device of claim 2, wherein the absolute-time calculating part calculates an absolute-time miss probability for a candidate absolute time using an equation shown below for each of the N number of slave devices (an N number of absolute-time miss probabilities), and calculates the absolute time as a candidate absolute time which results in all of the N number of absolute-time miss probabilities being lower than a preset threshold probability:

$$AMP_n = \frac{\int_D^\infty H_n(t)dt}{\int_0^\infty H_n(t)dt},$$

where AMPn is an absolute-time miss probability for an n-th slave device from among the N number of slave devices, Hn(t) is the curve-form histogram for the n-th slave device, and D is the candidate absolute time.

4. The master device of claim 3, wherein:
   when the reply message is received via the receiving part, the absolute-time calculating part calculates the N number of absolute-time miss probabilities by using the candidate absolute time; and if the calculated N number of absolute-time miss probabilities include an absolute-time miss probability that is higher than the threshold probability, the transmitting part re-transmits the request messages a K number of times, the receiving part re-receives the reply messages, and the absolute-time calculating part re-calculates the N number of absolute-time miss probabilities; and
   an operation of the transmitting part for transmitting the request messages, an operation of the receiving part for receiving the reply messages, and an operation of the absolute-time calculating part for calculating the absolute-time miss probabilities are repeatedly performed with the candidate absolute time incremented by a preset value until the N number of absolute-time miss probabilities do not include an absolute-time miss probability that is higher than the threshold probability.

5. The master device of claim 3, wherein an initial value of the candidate absolute time and the preset increment value are in correspondence to a transmission period of the request messages transmitted a K number of times.

6. A method of controlling a master device configured to calculate a synchronized actuation time for an N number of slave devices (N being an integer greater than or equal to 2), the method comprising:
   transmitting a request message a K number of times (K being an integer greater than or equal to 2) to each of the N number of slave devices, wherein the request message includes an actuation command and information on a time point when the request message was transmitted;
   receiving a reply message from each of the N number of slave devices, wherein the reply message includes information on a K number of end-to-end delay times, and an i-th end-to-end delay time from among the K end-to-end delay times corresponds to a difference between a time point when an i-th request message from among the request messages transmitted a K number of times was transmitted and a time point when the slave device was actuated by the i-th request message; and
   calculating an absolute time for concurrently actuating the N number of slave devices by using the information on the K number of end-to-end delay times received from each of the N number of slave devices.

* * * * *